United States Patent

[11] 3,607,347

[72] Inventors John L. Sprague
Holden;
Robert S. Pepper, Grafton; Eugene P. Donovan, Westborough; Frederick W. Howe, Westborough, all of Mass.
[21] Appl. No. 847,328
[22] Filed Aug. 4, 1969
[45] Patented Sept. 21, 1971
[73] Assignee Sprague Electric Company
North Adams, Mass.

[54] DATA REDUCTION AND STORAGE

7 Claims, 3 Drawing Figs.

[52] U.S. Cl. .......... 117/37 R, 96/36.2, 117/5.5, 117/8.5, 117/38, 161/413
[51] Int. Cl. .......... G03c 11/00
[50] Field of Search .......... 117/8, 8.5, 37, 38, 37 R, 212; 96/36, 36.2, 46; 264/139; 340/324

[56] References Cited

UNITED STATES PATENTS 2,533,454 12/1950 Gresham .......... 96/36 X
3,255,005 6/1966 Green .......... 96/36
3,255,006 6/1966 Bailey .......... 96/36

OTHER REFERENCES

Kooi, The Surface Properties of Oxidized Silicon, 1967, p. 14.

*Primary Examiner*—Robert F. Burnett
*Assistant Examiner*—Roger L. May
*Attorneys*—Connolly and Hutz, Vincent H. Sweeney, David R. Thornton and James Paul O'Sullivan

ABSTRACT: Permanent high density storage of alphanumerical information is provided by fine-line cuts which are extended through a thin surface layer to an underlying substrate and are arranged to provide a representation of the alphanumerical characters in microscopic size.

In the method, information in alphanumerical form is reduced to microscopic size and stored in a permanent medium by forming line cuts through a thin overlayer to a contrasting underlayer by photoreduction and photoetching techniques.

PATENTED SEP 21 1971 3,607,347

DATA REDUCTION AND STORAGE

BACKGROUND OF THE INVENTION

This invention pertains to data reduction and storage and more particularly to high density storage of alphanumerical data in a substantially permanent medium.

In the prior art, reduction and storage of graphical or alphanumerical data are generally provided by microfilm techniques which although satisfactory for many uses, is limited in regards to achievable information density, and is susceptible to deterioration due to environmental conditions such that it fails to provide archival permanence.

It is an object of this invention to provide extremely high density storage of alphanumerical information.

It is another object of this invention to provide a recording medium suitable for permanent high density storage of alphanumerical data.

It is a further object of this invention to provide a high density storage device wherein alphanumerical information is recorded in microscopic size by line openings extended through a thin overlayer to a contrasting underlayer.

It is a still further object of this invention to provide a method of reducing and storing information within a permanent medium.

It is a further object of this invention to provide a method of storing information in microscopic size within a permanent medium by photoetching fine-line geometries through a thin overlying coating to an underlying layer.

SUMMARY OF THE INVENTION

In accordance with the invention the storage device, which provides substantially permanent storage of data in microscopic size, comprises a substrate having at least one major surface, a thin overlayer of substantially permanent material disposed on said surface, and fine-line openings disposed in said overlayer and arranged to provide a representation of graphical information in microscopic size.

In a more limited sense, the storage device comprises a substantially planar substrate having a thin film layer disposed on a substantially smooth surface thereof, said thin film providing contrast to said substrate, a plurality of fine-line openings disposed in said surface coating so as to expose said substrate surface, and said openings arranged in the form of alphanumerical indicia of microscopic size.

Broadly, in the method of the invention, high density data storage is provided by removing portions of a thin film surface layer to expose an underlying substrate in a representative image in microscopic size of alphanumerical information so as to provide a microscopic representation of said information In a preferred embodiment, the method of storing the information comprises forming a substrate having at least one smooth major surface, forming a thin film of durable material on said surface, depositing a radiation sensitive coating on said thin film, forming a reduced image of alphanumerical information on said coating by exposure to actinic radiation, removing reacted portions of said coating to leave fine-line openings therein which expose said thin film in a representative image in conformance with the line indicia of said information, etching away the exposed portions of said thin film to provide fine-line openings extending to said substrate, and removing said coating to provide a substantially permanent record in microscopic size of said indicia with said thin film.

DESCRIPTION OF THE PREFERRED EMBODIMENTS

Figure 1:
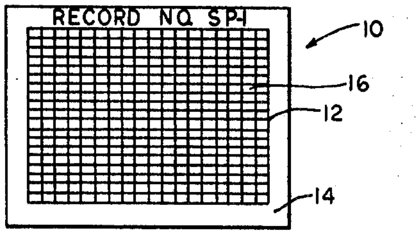
FIG. 1 is a plan view of a storage plate provided in accordance with the invention.
Figure 2:
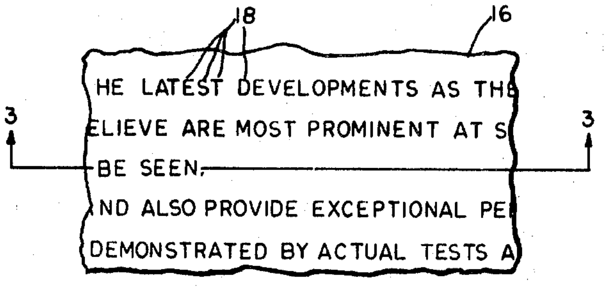
FIG. 2 is a plan view magnified many times of a small information area of the plate shown in FIG. 1.
Figure 3:
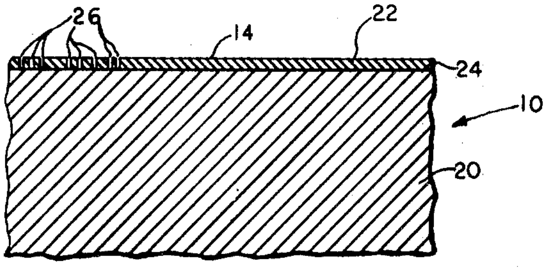
FIG. 3 is a view in section of the record taken along the lines 3—3 of FIG. 2.

In FIG. 1, a plate 10 is shown having a large amount of information or data 12 permanently recorded in alphanumerical form and microscopic size on its upper surface 14. This is shown more clearly in FIG. 2 wherein a small portion 16 of plate 10 is magnified many times to show the indicia 18 in approximately it original size.

Preferably, plate 10 is a substantially flat sheet having a body or substrate 20 of durable material for example, an inorganic material such as silicon or tantalum or the like and having a thin film surface layer 22 of highly durable material which provides a contrast and has high adherence to the substrate surface 24. For example silicon dioxide, or other compounds of the substrate which are grown or formed in situ on the substrate provide suitable adherence.

The information, or that is, the microscopic sized, representative indicia or characters 18 are formed by fine-line openings or trenchlike cuts 26 which extend through thin film 22 to surface 24 so as to provide a representative image of the information permanently stored in plate 10.

In the preferred method of the invention, a substrate 20 of inorganic material such as silicon is first prepared by conventional means with a highly polished upper surface 24. Thereafter a thin film surface coating 22 of silicon dioxide or the like is grown on the substrate surface. A photosensitive coating (not shown) is then deposited on the thin film layer. The alphanumerical information is photographically reduced, and the resulting positive image exposed on the photosensitive coating by ultraviolet light. Unexposed portions of the coating are then removed using conventional photoetching techniques to leave fine-line openings in the photoresist. Exposed portions of the thin film are then etched away by an acid solution, and finally, the photosensitive coating is thereafter removed to provide storage record plate 10 having data recorded by the fine-line openings of the thin film which are arranged to represent in microscopic size, the alphanumerical characters of the original documents.

Preferably, surface 24 is a smooth polished surface having selected radiation properties so as to provide contrast to the thin film. Hence, the underlying surface 24 and the thin film surface 14 should be sufficiently different in reflectivity, transmission or absorption of radiation, or in combinations of these, as to clearly reveal the characters when exposed to selected radiation, For optical retrieval of the information, optical contrast between the substrate and thin film is preferred. In addition to the cited characteristics, where the thin film is transparent, as in the case of silicon dioxide, the reflectivity of the underlying substrate must be low, or that is, in the range of the reflectivity of the thin film surface so that visible interference colors can result.

In the case of transparent films, the color results from the elimination or subtraction of particular frequencies by interference. Thus, with white light illumination of the unit, light having a wavelength $\lambda$ will be blanked out, or subtracted from, the reflected radiation depending upon film thickness. For the silicon-silicon dioxide system 900–1,000 Angstroms gives a characteristic blue-purple color when exposed to white light, while other colors of the spectrum results with thicker coatings. Generally 1,000—5,000 Angstroms coating thicknesses will be suitable, however, coatings in the 1,000 Angstrom range are preferred for the fine-line geometries necessary for maximum information density.

Monochromatic light can also be utilized for illumination and retrieval of information from this record system, since for example, if the slice is viewed with monochromatic light whose wavelength is in the interference or blanking range of the transparent coating, the coating will appear black while the exposed surface portions of the substrate (the characters) will reflect the source illumination.

Many different thin film and substrate materials can be employed. Preferably, both would be of inorganic material having high durability so as to provide archival permanence, that is, the structure should have good mechanical, chemical and thermal stability. Preferably, the thin film material should exhibit an exceptionally firm bond, to the substrate, as for example, the cohesive bond to be expected from thin coatings grown by chemical reaction with the substrate. However, films formed or deposited by other means such as vacuum deposition and the like may also be suitable.

Information may be recorded on one or more of the surfaces of the plate; for example, on both its planar surfaces. The data may be representative of nonrelated documents which are composed in side by side relation on the plate surface, or could provide a continuous narrative or account etc.

In a specific example, 74 printed sheets of approximately 8½"×11" size were reduced approximately 200 times in size and stored in a 0.21 square area of a single 1- ½-inch diameter, 14 mil thick oxidized slice of silicon. Each printed sheet was first copied by electrostatic means, and a 1 to 1 positive transparency then made by means of the Diazo process. Groups of approximately 6 to 9 of the transparencies were then mounted in a side-by-side relationship and photographically reduced by 20X and recorded on high resolution photographic plates by means of a photographic system.

The initial composite plates were then further reduced by about 10 times and composed in a side-by-side relation on a single high resolution photographic plate to provide a positive image mask. This was accomplished by photographically exposing each initial composite negative at selected coordinates of the final photographic plate by means of a step and repeat camera; that is, a different composite plate was exposed at each step of the camera. The final composed image was then transferred to the oxidized silicon slice by photolithographic techniques.

A 1,000 Angstrom thick surface film of silicon dioxide was first thermally grown on the slice by conventional semiconductor techniques of heating the slice to approximately 1,100° C in an oxygen atmosphere. The slice was then coated with very thin KTFR photoresist, for example, a 5,000 Angstrom thick coating. The final composite was then disposed over the photoresist and the combination exposed to ultra violet light in the conventional manner. Thereafter, the photoresist was washed away in the developed or that is, nonpolymerized areas so as to provide fine-line openings in the resist coating in conformance with the printed characters of the original documents.

The unit was then treated with an ammonium fluoride buffered solution of hydrofluoric acid to etch through the silicon oxide exposed in the openings of the photoresist coating. The solution is chosen to rapidly etch the thin film, and to not attack or only very slowly etch the substrate. Finally, the unit was completed by stripping the photoresist with sulfuric acid or the like. This provided a silicon slice having approximately 74 images of the original documents within a 0.21-inch square area of the slice.

The final composite plate in this case was a positive image; that is, the dark lines of the composite presented, in highly reduced size, the printed lines of the original information. Hence, in this case, the openings in the photoresist corresponded to the printed lines of the original. However, a negative image could also be utilized to result in raised lettering that is, in relief. Moreover, other types of photoresist could be employed with a positive image or the like to permit removal of the coating around the lettering etc.

Other means of providing the initial composite plate can be utilized. For example, reversal film can be employed to provide a direct positive plate from the original document prior to the initial reduction and composition step. Moreover, either or both the initial and final composite plates may be made by reduction and composing directly from the original document. Additionally, different photographic reduction techniques may also be employed to provide the final photographic plate of the specific example, and it should be understood that the step and compose technique may be employed to provide a composite directly on the photoresist so as to eliminate contact printing of the photoresist.

As previously indicated, many different substrates and surface films may be utilized to store graphic line information. The underlying substrate should provide support and contrast to the thin film. Additional support and permanence can also be achieved by mounting the substrate on a supporting base.

Many different contrasting properties can be employed. That is, transparent thin films can be employed on an opaque substrate as described in preferred embodiment. Opaque films of different color than the substrate can be utilized. Additionally, a transparent substrate may be suitable, for example, aluminum, gold or other thin metallic films on plastics such as Mylar, or glass or quartz would be useful. Chromium, deposited by sputtering or the like, on glass or quartz will provide a highly permanent medium.

For high speed retrieval of the informations, such as for use in computers or the like, flexible substrates would be desirable. For example, metal thin films on plastics or contrasting metal layers would be suitable.

Of course, any graphic representation may be reduced and stored in the indicated manner. For example, three dimensional images may be provided by providing two superimposed images etched to different depths. Advantageously, three-dimensional displays may also be stored in two side-by-side patterns which are later composed by the retrieval system.

Information retrieval can be accomplished in many different ways. For example, for retrieval from a Si-$SiO_2$ record, optical means utilizing reflected radiation is suitable. A microscope or an optical comparator can be utilized to a view a magnified image of the stored data. In this case, the instrument can be directed to selected coordinates of the record by manual or electronic means or the like.

Direct viewing or projection-type arrangements may be employed for records designed for viewing by either reflected or transmitted illumination. The latter would require records having a substantially opaque thin film and a substantially transparent substrate, such as for example, aluminum or other metallic films on glass or quartz or the like.

Other forms of retrieval, such as electron scanning can be utilized. For example, a flying spot scanner and electron microscope techniques can be employed for electronic read out and the like. That is, both primary and secondary interaction with the stored medium may be employed. For electron scanning or the like, the contrast between the thin film and substrate must be applicable to that radiation rather than optical radiation as previously indicated.

Thin films of inorganic materials having a high melting point, for example of metals such as chromium or refractory materials such as oxide or the like are preferable. Of course, the substrate can be of any material which will not react with the film and which provides mechanical support and contrast to it. Moreover, the substrate itself may be laminated to or mounted on other materials such as metals or the like to protect the unit from mechanical stress, etc.

There is a fundamental limitation due to diffraction scattering of light such that images down to about one-half micron can only be formed with ultraviolet light. For finer-line geometries and greater reduction factors, electron beam techniques can be employed. For example, the image can be written in highly reduced form on suitable photoresist by a controlled electron beam, or the beam can be used directly on the thin film to remove or cut the film, for example by evaporation of a metal film.

Hence many different embodiments may be realized without departing from the spirit and scope of the invention and it is to be understood that the invention is not to be limited except as in the appended claims.

What is claimed is:

1. A high density data storage device for providing substantially permanent storage of alphanumerical information in microscopic size, said device comprising a substrate having a least one major surface, a thin film overlayer of substantially permanent material disposed on said surface, said thin film having contrasting radiation characteristics with respect to said substrate, openings disposed in said thin film so as to expose the underlying substrate, and said openings arranged to provide a representation of said information in microscopic size.

2. The device of claim 1 wherein said openings are fine-line openings arranged in conformance with the alphanumerical characters of said information.

3. The device of claim 1 wherein said substrate is a planar member of inorganic material having s smooth and substantially flat major surface and said thin film is an inorganic film of high permanence.

4. The device of claim 1 wherein said substrate is of transparent material, and said thin film is of opaque material.

5. The device of claim 1 wherein said substrate is of substantially opaque material, said overlayer is of substantially transparent material, said substrate having low optical reflectivity, and said coating being sufficiently thin as to provide optical contrast to said substrate.

6. The device of claim 5 wherein said substrate is silicon, and said film is of silicon dioxide.

7. The device of claim 5 wherein said thin film is approximately 1,000 to 5,000 Angstroms thick.